No. 771,789. PATENTED OCT. 4, 1904.
W. F. MOUGHLER.
PNEUMATIC POWER SYSTEM.
APPLICATION FILED AUG. 24, 1903.
NO MODEL. 2 SHEETS—SHEET 1.
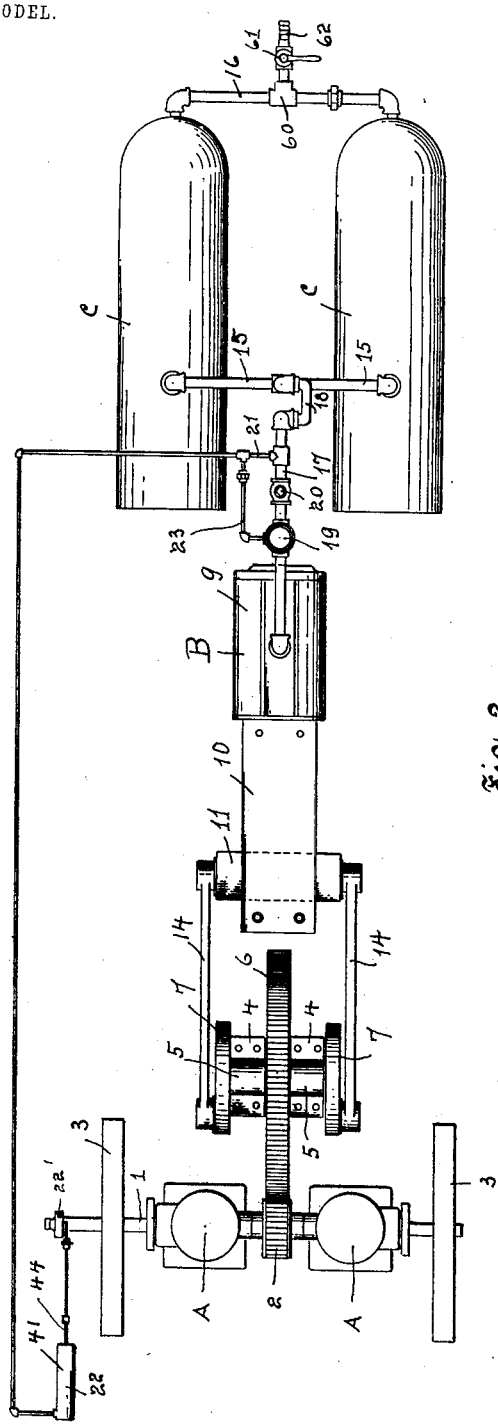
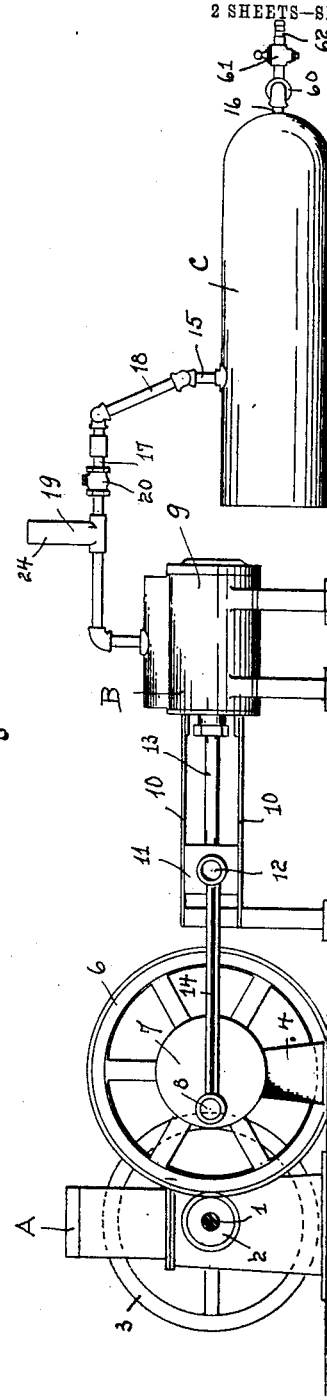

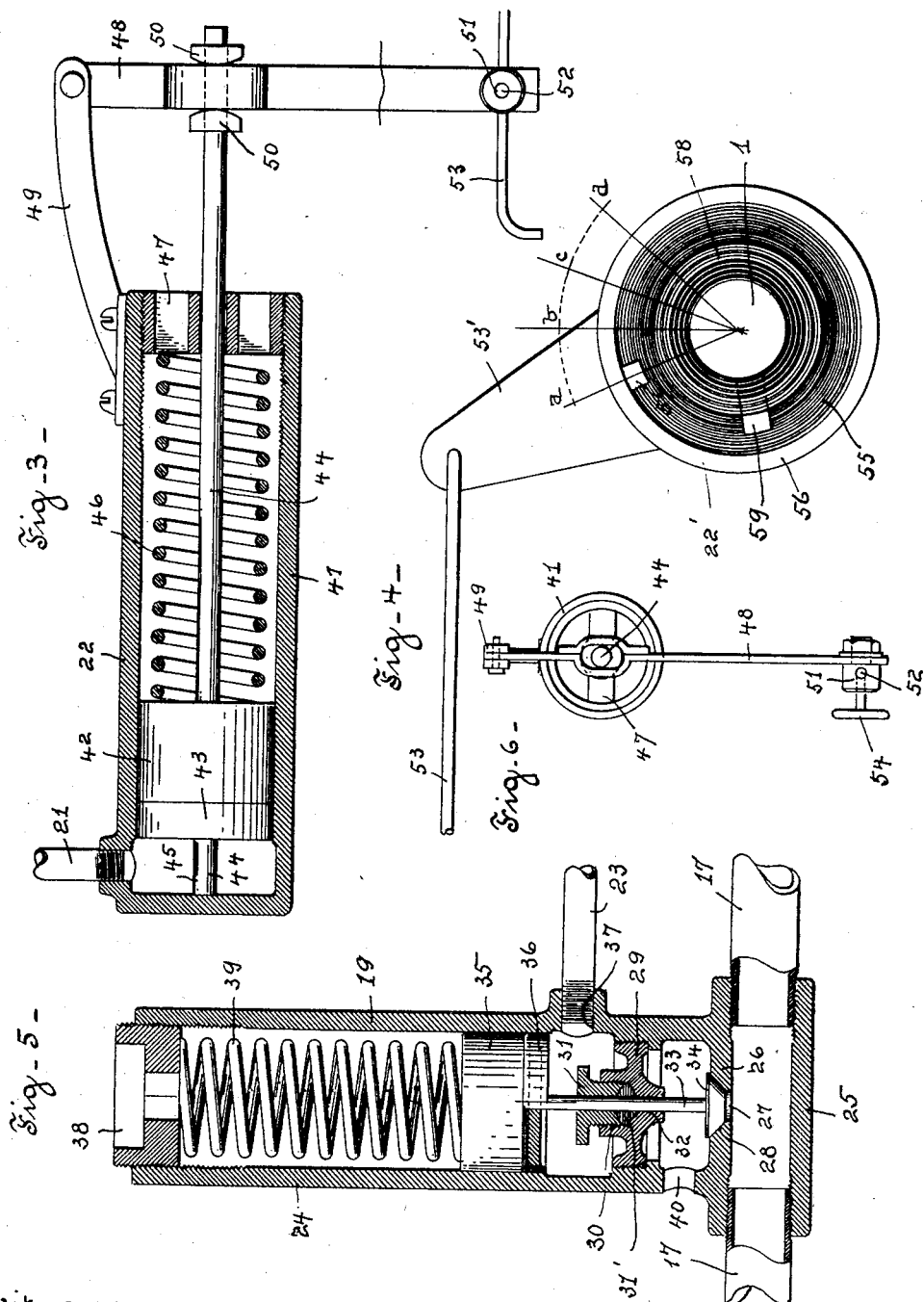

No. 771,789.

Patented October 4, 1904.

UNITED STATES PATENT OFFICE.

WILLIAM F. MOUGHLER, OF TOLEDO, OHIO.

PNEUMATIC POWER SYSTEM.

SPECIFICATION forming part of Letters Patent No. 771,789, dated October 4, 1904.

Application filed August 24, 1903. Serial No. 170,540. (No model.)

*To all whom it may concern:*

Be it known that I, WILLIAM F. MOUGHLER, a citizen of the United States, residing at Toledo, in the county of Lucas and State of Ohio, have invented a new and useful Improvement in Pneumatic Power Systems, of which the following is a specification.

My invention relates to a pneumatic power system, and has for its object to provide a system of the kind wherein a predetermined air-pressure is automatically maintained in a receiver from which a varying volume of compressed air is supplied for motive power as required for use; furthermore, to provide a system of the kind in which the supply of air to the receiver is automatically adjusted to a varying demand thereon for use; furthermore, to provide a system of the kind comprising a motor, an air-compressor operated by the motor, and a receiver for the compressor so connected that the air-pressure maintained in the receiver automatically regulates the speed of the motor and the supply of air delivered by the compressor into the receiver according to the volume withdrawn from the receiver for use, whereby a predetermined pressure is maintained in the receiver; furthermore, to provide a system of the kind described wherein when no air is being used from the receiver no air is supplied thereto by the compressor and the motor is automatically reduced in power and speed proportionate to the reduced load without stopping and that when air is again released from the receiver for use such release will automatically increase the power and speed of the motor, and thereby cause the compressor to deliver onto the receiver a volume of air equal to the volume withdrawn.

I accomplish these objects by constructing a pneumatic power system as hereinafter described, and illustrated in the drawings, in which—

Figure 1 is a diagrammatic view of my invention. Fig. 2 is a side elevation of the same. Fig. 3 is a longitudinal section through the circuit-breaker regulator. Fig. 4 is a plan view of the circuit-breaker, and Fig. 5 is a longitudinal section of the pressure-regulator and controller. Fig. 6 is an end view of the rock-lever arranged to move the adjusting-rod of the circuit-breaker when the same is connected thereto.

In the drawings, A A represent a pair of gas-engines connected to a common crank-shaft 1, having centrally mounted thereon between the engines a driving gear-wheel 2 and on the outer end portions the fly-wheels 3. Mounted central between suitable pillar-blocks 4, having top bearings 5 and intermeshing with gear-wheel 2, is a gear-wheel 6 of increased diameter, the axle of which is journaled in the bearings 5 and is provided at the outer ends with crank-disks 7, having the crank-pins 8 extending outwardly in alinement therefrom.

B represents a double-acting air-compressor having the cylinder 9, the guides 10, the cross-head 11, provided with the end trunnions 12, and the piston-rod 13, suitably secured central to the cross-head and axial to the piston. The trunnions of the cross-head are connected to the crank-pins of the disks 7 by the connecting-rods 14.

C C represent a pair of receivers for the compressor B, which are connected by the common pipes 15 and 16, and the receivers are connected with the compressor by the supply-pipe 17, which is connected to the pipe 15 by the swivel-coupling 18, whereby the receivers and their connections are unaffected by the vibration of the compressor. Interposed in the supply-pipe 17 between the swivel-coupling 18 and the air-compressor is the pressure-regulating valve 19, and between the regulating-valve and the swivel-coupling is the back check-valve 20. Between the back check-valve and the swivel-coupling there is also provided a T, from which a small branch pipe 21 extends to the circuit-breaker regulator 22, and from the branch pipe 21 extends a bleeder-pipe 23 to the pressure-regulator 19, by means of which branches the pressure in the respective regulators is always the same as the pressure in the receivers.

The body of pressure-regulator 19 comprises the open-top cylinder 24 and the tubular base 25, transverse the bore of the cylinder. The base 25 is separated from the cylinder by the diaphragm 26, in which is formed a port 27 and a valve-seat 28. The ends of the base 25 are suitably threaded for coupling together sections of the supply-pipe 17. Above the diaphragm 26 in the cylinder 24 is provided a diaphragm 29, which is bored through and counterbored and the counterbored portion threaded to form the seat 30 for the stuffing-box 31, which is externally threaded and run into the seat to compress the packing 31'. Centrally through the stuffing-box is provided an orifice 32, through which is inserted a valve-stem 33 of the valve 34, adapted to fit into the valve-seat 28. Secured to the upper end of the valve-stem is a piston 35, provided with a packing 36, and between the piston and the stuffing-box is an air-chamber, opposite to which is provided a threaded orifice 37 in the wall of the cylinder to receive the bleeder-pipe 23. The top end of the cylinder 24 is internally threaded to receive the plug 38, and between the plug and the piston the helical spring 39 is compressed to resist a predetermined working pressure in the receiver. Between the diaphragms 26 and 29 is provided an orifice 40 in the wall of the cylinder 24, through which the air in the supply-pipe 17 escapes when the valve 28 is raised from its seat.

The circuit-breaker regulator 22 comprises the cylinder 41, closed at one end and having the opposite end open and internally threaded, the piston 42 closely fitting within the cylinder and provided with the packing 43 at the inner end, the stem 44 of the piston having the end portion 45 projecting from the inner end of the piston and adapted to engage the closed end of the cylinder and limit the inward movement of the piston, the helical spring 46 within the cylinder around the stem, the compression-plug 47, having a central orifice to receive the stem and threaded into the end of the cylinder against the end of the spring and adapted to compress it on the piston, the lever 48, pivoted at its upper end portion to a suitable support 49 and provided with a slot to receive the stem, the collars 50, mounted on the stem on opposite side of the lever and having crowned faces adapted to engage the lever, the free end of the lever being provided with a rotatable wrist-pin 51, having a transverse orifice 52 to adjustably receive the connecting-rod 53 and provided with a set-screw 54 to secure the rod when adjusted to the wrist-pin. The connecting-rod 53 at the opposite end is pivoted to the lever-arm 53' of the circuit-breaker 22', which latter may be of any suitable construction, but preferably comprises a disk 55, of insulating material, rotatably mounted on the shaft 1 and having a peripheral flange 56, provided with a radial contact-plug 57 and a disk 58, formed of insulating material and fixed concentric on the shaft in the plane of the peripheral flange 56 and provided with spring-contact 59, adapted to contact with the plug 57 at each revolution of the shaft, the plug 57 and spring-contact 59 being suitably connected in circuit with an induction-coil and battery and with a sparking plug (not shown) in each cylinder.

The cranks of shaft 1 extend radially therefrom on the same side and in the same plane, so that the pistons of both cylinders move in unison, and the intake-valve mechanism is so arranged that a charge of gas is alternately drawn into the respective cylinders during alternate downstrokes of the pistons and is ignited on the downstrokes succeeding the intake of the charge in the respective cylinders. The engines are suitably connected to a gas or oil supply. (Not shown.)

The pipe 16, connecting the receivers, is provided with the T 60, to which is coupled the closure-valve 61, and to the valve 61 is coupled the nipple 62 for the attachment of an air-supply hose-pipe or other pipes main (not shown) from which flexible branch connections may extend for operating different pneumatically-driven tools, each under the control of a different operator.

In Fig. 4 the arc of the movement of the contact-plug of the disk 55 in timing the make and break of the circuit with reference to the downstrokes of the pistons is represented by the arc $a\ b\ c\ d$, in which the most effective ignition of a charge when the engine is running at normal speed figuratively occurs at $a$ before the downstroke begins, and from which point toward $d$ the power of a charge diminishes in proportion to the distance the piston has traveled on its downstroke before ignition of the charge occurs.

The engines A A are of capacity to produce a working pressure P in the receivers at a minimum speed X. The spring 46 in the circuit-breaker regulator is adjusted to yield a pressure P— and to reach the limit of its compression at P—, and when the pressure in the receiver equals P the movement of the regulator-piston is such as to adjust the disk-plug at $c$ in the arc $a$, $b$, $c$, and $d$. The spring of the pressure-regulator is adjusted to yield at a pressure P— in the receiver.

Thus constructed and adjusted the operation of my system is as follows: Before starting the engines the cylinder-cocks of the compressor are opened and the set-screw 54 is loosened and the disk 55 moved to adjust the make and break of the circuit for charges of reduced compression. After starting the engines the disk 55 is gradually moved to the position $b$ until the speed reaches X—. The cylinder-cocks are then closed and the set-screw 54 is tightened on the connecting-rod 53. When the pressure in the receivers is raised to P—, the spring 46 begins to yield and the disk 55 is gradually moved as the pressure in the receivers rises until the contact is made at $c$ and the speed is reduced to X with the pressure at P. At this speed the capacity of the compressor should be equal to supply a normal use of air from the receiver and maintain the pressure P. In the event of a greater use of air the lowering of the pressure in the receiver causes the shifting of the contact-point toward $b$, thereby increasing the power and speed of the engines and proportionately increasing the supply from the compressor, whereby the increased demand on the receivers is met by an increased supply from the compressor and the average pressure P is substantially maintained. On the other hand, if the demand on the receiver is less than the rate of supply from the compressor the contact-point will be shifted toward $d$, whereby the speed of the engine will be reduced and the supply from the compressor will be proportionately reduced and the pressure P in the receiver will be maintained. Should the demand on the receiver cease or be reduced so low that the pressure in the receiver increases to P—, the spring of the pressure-regulator then yields, thereby opening the valve 34 and allowing the air pumped by the compressor to escape through the valve and the leak-orifice. At the same time the increased pressure in the receiver will shift the contact-point still farther toward $d$, thereby reducing the speed of the engine without allowing it to come to a full stop. While thus running if an operator turns on the air for use when the pressure in the receiver has been lowered to P the valve 34 will close, the contact will be shifted toward $a$, and the speed of the engine and compressor will be increased, whereby the pressure in the receivers will be maintained.

By the use of a double-cylinder gas-engine connected as shown and described and having a power-stroke of one piston at each revolution of the shaft the steadiness of power essential for operating a double-acting air-compressor is attained, and by the use of the speed-reducing gear-wheel 6 the high speed of the engine is made available for operating the compressor at reduced speed and with increased power.

What I claim to be new is—

1. In a pneumatic power system, the combination with a gas-engine, an air-compressor, and a receiver, so connected that the engine operates the compressor to maintain a pressure of air in the receiver, of an adjustable circuit-breaker for the engine adapted to be adjusted to cause ignition of different charges at different points in the travel of the piston and at different degrees of compression and thereby increase or diminish the power and speed of the engine, a regulator for the circuit for the circuit-breaker, comprising a cylinder, a piston in the cylinder, a helical spring in the cylinder engaging one end of the piston and one end of the cylinder, and normally resisting the movement of the piston toward the spring, a pipe connecting the cylinder with the receiver, means connecting the piston with the circuit-breaker adapted to shift the point of contact of the circuit-breaker to reduce the power and speed of the engine proportionately to the movement of the piston against the resistance of the spring, and to increase the power and speed of the engine proportionately to the movement of the piston by the spring against the resistance of the air in the cylinder, substantially as set forth.

2. In a pneumatic power system, the combination of a gas-engine, an air-compressor adapted to be operated by the engine, a receiver adapted to supply compressed air for power purposes, a supply-pipe connecting the compressor with the receiver, an adjustable circuit-breaker for the engine, a regulator connected to the circuit-breaker and with the receiver adapted to automatically shift a contact and thereby increase the power and speed of the engine according as the pressure in the receiver diminishes and diminish the power and speed of the engine as the pressure increases in the receiver, a back check-valve in the supply-pipe, a spring-pressed relief-valve connected to the supply-pipe between the back check-valve and the compressor, and to the receiver, and adapted to be opened by a predetermined pressure in the receiver to permit the escape of air pumped by the compressor and to be closed and held closed by the spring while the pressure in the receiver remains below such predetermined pressure, substantially as and for the purpose set forth.

3. In a pneumatic power system comprising a gas-engine, a compressor adapted to be operated by the engine and a receiver adapted to receive air from the compressor and to supply compressed air for power purposes, the combination of a circuit-breaker comprising a fixed disk and a movable disk mounted concentric on the shaft of the engine each disk having a contact adapted wherever brought into contact one with the other in the revolution of the shaft to complete an electric circuit adapted to ignite a charge of gas in the engine-cylinder, a regulator for the circuit-breaker, comprising a cylinder closed at one end and provided with an adjustable plug in the opposite end having a central orifice, a piston in the cylinder, a stem for the piston extending through the orifice of the plug, a helical spring interposed between the plug and the piston, a lever adapted to be actuated by the stem, a connecting-rod adjustably and pivotally secured to the lever and to the movable disk of the circuit-breaker, and a pipe connecting the receiver with the regulator-cylinder between its closed end and the piston, substantially as and for the purpose set forth.

4. In a pneumatic power system, the combination of a pair of gas-engines, a common crank-shaft for the engines having a double crank for each engine extending radially in the same plane and from the same side, a driving gear-wheel mounted on the shaft central between the engines, a double-acting air-compressor having its piston-rod in alinement with the gear-wheel on the engine-shaft, a cross-head centrally secured to the outer end of the piston-rod at right angles to the rod, and having end trunnions, guides for the cross-head, an intermediate gear-wheel of increased diameter adapted to intermesh with the gear-wheel on the engine-shaft, an axle for the intermediate gear-wheel having end journals mounted in bearings, a crank-disk mounted on the outer end of each journal, a pair of connecting-rods connecting the wrist-pins of the crank-disks and the trunnions of the cross-head and means to explode a charge of gas alternately in each engine-cylinder and at alternate downstrokes of each engine.

In witness whereof I have hereunto set my hand this 5th day of August, 1903.

WILLIAM F. MOUGHLER.

Witnesses:
   WILLIAM H. MOOR,
   LAURA YOUNGS.